United States Patent [19]

Schütz et al.

[11] Patent Number: 4,470,927
[45] Date of Patent: Sep. 11, 1984

[54] METHOD OF EXTRACTING THE FLAVORING SUBSTANCES FROM THE VANILLA CAPSULE

[75] Inventors: Erwin Schütz, Palling; Heinz-Rüdiger Vollbrecht, Stein; Klaus Sandner, Trostberg; Theodor Sand; Peter Mühlnickel, both of Holzminden, all of Fed. Rep. of Germany

[73] Assignees: SKW Trostberg Aktiengesellschaft, Trostberg; Haarmann & Reiner, Holzminden, both of Fed. Rep. of Germany

[21] Appl. No.: 416,732

[22] Filed: Sep. 10, 1982

[30] Foreign Application Priority Data

Sep. 18, 1981 [DE] Fed. Rep. of Germany ....... 3137230

[51] Int. Cl.$^3$ ............................................. C07G 11/00
[52] U.S. Cl. .................................................. 260/236.5
[58] Field of Search ...................................... 260/236.5

[56] References Cited

FOREIGN PATENT DOCUMENTS 2127611 12/1942 Fed. Rep. of Germany ...... 426/312
1336511 11/1973 United Kingdom ................ 426/312

Primary Examiner—Albert T. Meyers
Assistant Examiner—John Rollins, Jr.
Attorney, Agent, or Firm—Felfe & Lynch

[57] ABSTRACT

A process for recovering flavoring substances from the vanilla capsule with carbon dioxide under fluid conditions is described, which consists in performing the extraction at temperatures between 10° and 30° C. and pressures of 80 to 350 bar, and producing the separation of the extract at temperatures of 0° to 30° C. and pressures of 30 to 60 bar. In this manner it is possible by a one-step process to extract all of the flavoring substances of the vanilla capsule with the recovery of a highly concentrated vanilla flavoring, and to obtain a material which is considerably superior to the products obtained by conventional extraction with organic solvents.

5 Claims, No Drawings

METHOD OF EXTRACTING THE FLAVORING SUBSTANCES FROM THE VANILLA CAPSULE

This invention relates to a method for recovering the flavoring substances from the vanilla capsule. More specifically, the process involves extraction of the vanilla capsule with carbon dioxide under supercritical conditions, with the formation of a concentrated extract containing all of the flavoring substances of the vanilla capsule which is composed of vanillin, vanillic acid and essences.

Vanilla, i.e., the fruit capsule of a tropical species of orchid, contains a very pleasing, highly aromatic flavoring which is composed not just of vanillin but also of vanillic acid and other essences. Since the flavor of artificial vanilla, and even of the available vanilla extracts is unsatisfactory, there is a considerable need for vanilla extracts which contain the concentrated flavor of the vanilla capsule (also called the vanilla bean and vanilla pod). Extracts have been prepared by formerly known methods from vanilla capsules by means of organic solvents. However, undesirable substances are extracted along with the desired flavorings, and some of them have to be removed by expensive separating techniques.

Quite recently a process has become known whereby it is possible by two-step extraction with supercritical gases such as carbon dioxide, nitrogen dioxide, sulfur hexafluoride, trifluoromethane, trifluorochloromethane, difluoromethane, difluoroethylene, perfluoropropane, ethane or ethylene to obtain vegetable extracts having a natural composition (German Pat. No. 2,127,611). The disadvantage of this known process is to be seen in the fact that the process must be performed in two steps in order to obtain both the essences and the flavorings. The long extraction periods and high pressures specified (400 bar, Example 4) make the process appear uneconomical.

Very recently another two-step process has become known, in which temperatures below the critical point of the extraction gases and above the critical pressure are used in the first step, and in the second step, supercritical pressures and temperatures are applied. This process, too, appears to be complex.

The object of the present invention therefore consists in devising a method for recovering the aromatic substances from the vanilla capsule by extraction with carbon dioxide under fluid conditions, which will make it possible to extract in an optimum manner all of the substances contained in the vanilla capsule, and to recover a concentrated flavoring from the vanilla capsule even by a single-step process.

It has been found surprisingly that this can be accomplished by means of a process of the kind defined above, which is characterized by the fact that the extraction is performed at temperatures between 10° and 30° C. and pressures of 80 to 350 bar, and the separation of the extract is brought about at temperatures from 0° to 30° C. and pressures of 30 to 60 bar.

The subject matter of the invention is therefore the process specified in the principal claim. The subordinate claims relate to especially preferred embodiments of this subject matter.

In a preferred embodiment of the invention, the extraction is performed at pressures of 100 to 160 bar, and the extract is separated at temperatures of 5° to 20° C. and pressures from 35 to 45 bar.

Particularly with regard to the achievement of a quantitative yield, it has proven to be surprisingly advantageous to subject the material to a preliminary treatment for the purpose of making the contents of the vanilla capsule more easily accessible to the extraction gas. In a preferred embodiment of the invention, therefore, the vanilla capsules are ground at a low temperature, of −50° to −30° C., preferably at approximately −40° C.

Surprisingly, however, it has also been found that the desired opening up of the cell tissue can also be accomplished in a simple manner by rapidly releasing the pressure from the extraction vessel after completing an extraction of coarsely comminuted vanilla capsules. If the extraction residue remaining after this procedure is subjected to further extraction under the same conditions, it is possible to obtain yields similar to those obtained by extracting the vanilla capsule material ground at low temperatures as described above.

As a consequence of another preferred embodiment of the invention, the coarsely comminuted vanilla capsules are thus opened up, after an initial extraction step, by the rapid release of pressure, and then they are again extracted at temperatures between 10° and 30° C. and pressures of 80 to 350 bar, preferably 100 to 160 bar, and this is followed by the separation of the extract in the manner described.

This procedure can be performed to special advantage in a plurality of extraction vessels connected in tandem if, when the extraction of one container has been completed, the compressed gas contained therein is let into an extraction vessel charged with fresh material, whereby the material contained in the first extraction vessel is subjected to a rapid release of pressure and opened up, and is then delivered to a final extraction with fresh carbon dioxide.

By the claimed process a vanilla extract is obtained which contains the concentrated vanilla flavoring and proves to be substantially stronger and more aromatic than the conventional vanilla extracts obtained with alcohol, and additionally contains other volatile flavoring components which are not contained in the conventional alcoholic extract of the vanilla capsule.

EXAMPLE 1

600 g of vanilla capsules are finely ground while deep-frozen at −40° C. The ground material is extracted in the extraction autoclave for three hours with carbon dioxide at 160 bar and 25° C. The separation of the extract is performed at 39 bar and 11° C. The yield, with respect to vanillin, is 98.5%.

The quality of the vanilla extract obtained in this manner was judged by analysis and by taste tests. In the taste test, 100 kg of an ice cream mixture was flavored with 80 g of a vanilla extract obtained with alcohol in the conventional manner. The vanilla extract obtained with alcohol was produced from the same lot of vanilla capsules as that obtained by carbon dioxide extraction in accordance with the invention. This ice cream flavored with conventional vanilla extract was taste-tested against an ice cream flavored in the same ratio with the vanilla extract obtained by the method of the invention. In a test by a panel of 14 persons, the ice cream samples flavored with the vanilla extract obtained in accordance with the invention was unanimously preferred.

The gas-chromatographic analysis of the vanilla extract conventionally obtained with alcohol and of the extract obtained by the method of the invention show that the vanilla capsule components relevant to the vanilla flavor are contained in the extract obtained by the method of the invention in an amount of 120 to 130% as compared with the alcoholic extract obtained in the conventional manner. It is especially striking that a number of highly volatile flavoring components can be detected only in the vanilla extract obtained by the invention.

EXAMPLE 2

12 kg of vanilla capsules are coarsely comminuted in a cutting machine and extracted in this form with carbon dioxide in an extraction autoclave for 1½ hours at 160 bar and 27° C. In the meantime the second extraction autoclave is filled with the same amount of coarsely chopped vanilla capsules. After 1½ hours the gas is let out of the first extraction autoclave into the second extraction autoclave. This causes the pieces of vanilla capsule contained in the first extraction autoclave to expand, thus perceptibly increasing their bulk (approximately 30%). The material in the first extraction autoclave is then extracted for another 1½ hours, the extraction gas being fed first through the first extraction autoclave and then through the second autoclave. After the extraction in the first autoclave has ended, the latter is charged with fresh material and the material in the second autoclave is subjected to the same procedure as described above with regard to the first extraction autoclave. The separation of the extract is performed at 39 bar and 11° C. The yield with respect to vanillin is 99%.

The taste-testing and analysis are performed in the same manner, and with the same result as described in Example 1.

It will be understood that the specification and examples are illustrative but not limitative of the present invention and that other embodiments within the spirit and scope of the invention will suggest themselves to those skilled in the art.

What is claimed is:

1. Method of extracting the flavoring substances from the vanilla capsule which method comprises extracting the vanilla capsule with carbon dioxide, at a temperature from 10° to 30° C. and a pressure of 80 to 350 bar, and performing the separation of the extract at a temperature of 0° to 30° C. and pressures of 30 to 60 bar.

2. Method as claimed in claim 1, wherein the extraction is performed at pressures of 100 to 160 bar and the separation at temperatures of 5° to 20° C. and pressures of 35 to 45 bar.

3. Method as claimed in claim 1, wherein the vanilla capsules are ground at a temperature of −50° to −30° C. prior to extraction.

4. Method as claimed in claim 1, wherein only coarsely comminuted vanilla capsules are expanded by rapid release of pressure after a first extraction and then again extracted at temperatures between 10° and 30° C. and pressures of 80 to 350 bar.

5. Method as claimed in claim 4, wherein the extraction is performed in a plurality of extraction vessels connected in series, and the laden, compressed gas obtained in the first extraction is transferred to an additional extraction vessel charged with fresh vanilla capsules, while the remaining material, already pre-extracted and expanded, is again extracted with fresh carbon dioxide.

* * * * *